United States Patent

[11] 3,597,547

[72] Inventor Johan Nils Roll
Stockholm, Sweden
[21] Appl. No. 797,127
[22] Filed Feb. 6, 1969
[45] Patented Aug. 3, 1971
[73] Assignee Telefonaktiebolaget L. M. Ericsson
Stockholm, Sweden
[32] Priority Feb. 20, 1968
[33] Sweden
[31] 2,185/68

[54] APPARATUS FOR SYNCHRONIZING A PCM-RECEIVER AND A TRANSMITTER

1 Claim, 3 Drawing Figs.

[52] U.S. Cl. 179/15 BS
[51] Int. Cl. H04j 3/06
[50] Field of Search 179/15; 178/69.5

[56] References Cited

UNITED STATES PATENTS

| | | | |
|---|---|---|---|
| 3,463,887 | 8/1969 | Ito | 179/15 |
| 3,127,475 | 3/1964 | Coulter | 179/15 |
| 3,454,722 | 7/1969 | Jousset et al. | 179/15 |
| 3,461,245 | 8/1969 | Johannes et al. | 179/15 |

*Primary Examiner*—Kathleen H. Claffy
*Assistant Examiner*—David L. Stewart
*Attorney*—Hane and Baxley

ABSTRACT: A method for synchronizing the receiver and the transmitter in a PCM-receiver system wherein binary information is transmitted within cyclically occurring channels. The last bit of each of the channels form a synchronization pattern, which is regular but has at least one irregularity which occurs within a predetermined channel. By first using the regular part of the synchronization pattern for synchronizing the bit distributors of the transmitter and the receiver and then the irregularity for synchronizing the channel distributors a very fast two stage synchronization process is obtained.

INVENTOR
JOHAN NILS ROLL
BY Hane and Baxley
ATTORNEYS

INVENTOR
JOHAN NILS ROLL
BY Hane and Baxley
ATTORNEYS

APPARATUS FOR SYNCHRONIZING A PCM-RECEIVER AND A TRANSMITTER

The present invention relates to a method in a PCM-receiver, to which binary coded signals are transmitted from a transmitter in a time division multiplex form within a number of cyclically occuring channels and where a binary digit in a certain position within each channel is used for a purpose other than transmission of information, for synchronizing a bit position—and a channel distributor with the corresponding devices in the transmitter, and an arrangement for carrying out the method.

In a time division multiplex transmission of pulse code modulated signals within a number of channels each digit obtained on the receiver side corresponds to a certain position in a certain channel. In order to determine to which digit position and which channel a digit belongs, there are in the receiver a bit distributor and a channel distributor which are to work synchronously with the corresponding devices in the transmitter. For checking that this is the case one can, for example, reserve a bit in each channel for synchronization information. This takes place in such a way that, for instance, the last bit in each channel is not used for information transmission but is instead given a definite value. If the synchronism ceases this digit value is not obtained on the receiver side in the last bit position. This fact indicates that synchronization has been lost. Hereby the transmitter obtains a signal from the receiver, after which the transmitter transmits a signal which at first sets the bit—and channel distributor of the receiver in a certain state and then transmits the digit corresponding to this state, which implies that synchronism has again been obtained. This method thus requires that it should be possible to transmit information from the receiver to the transmitter, which makes the equipment much more expensive. An object of the present invention is to provide a method for adjusting the bit—and channel distributor in a PCM-receiver synchronously with the corresponding devices in the transmitter, whereby said inconvenience is eliminated, and an arrangement for carrying out the method. The characteristics of the invention are stated in the claims following the description.

Figure 1:
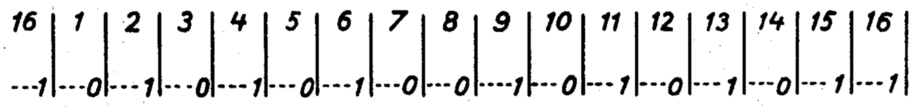
Figure 2:
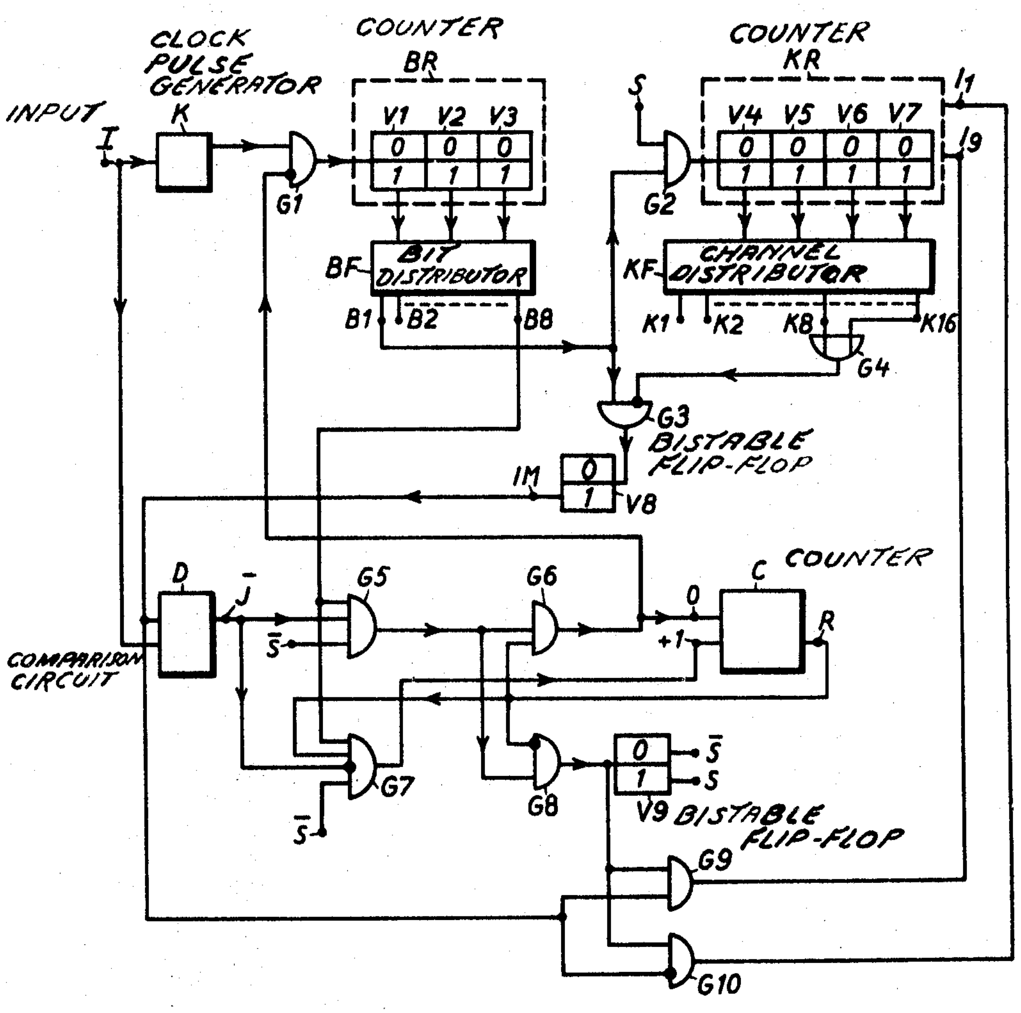
Figure 3:
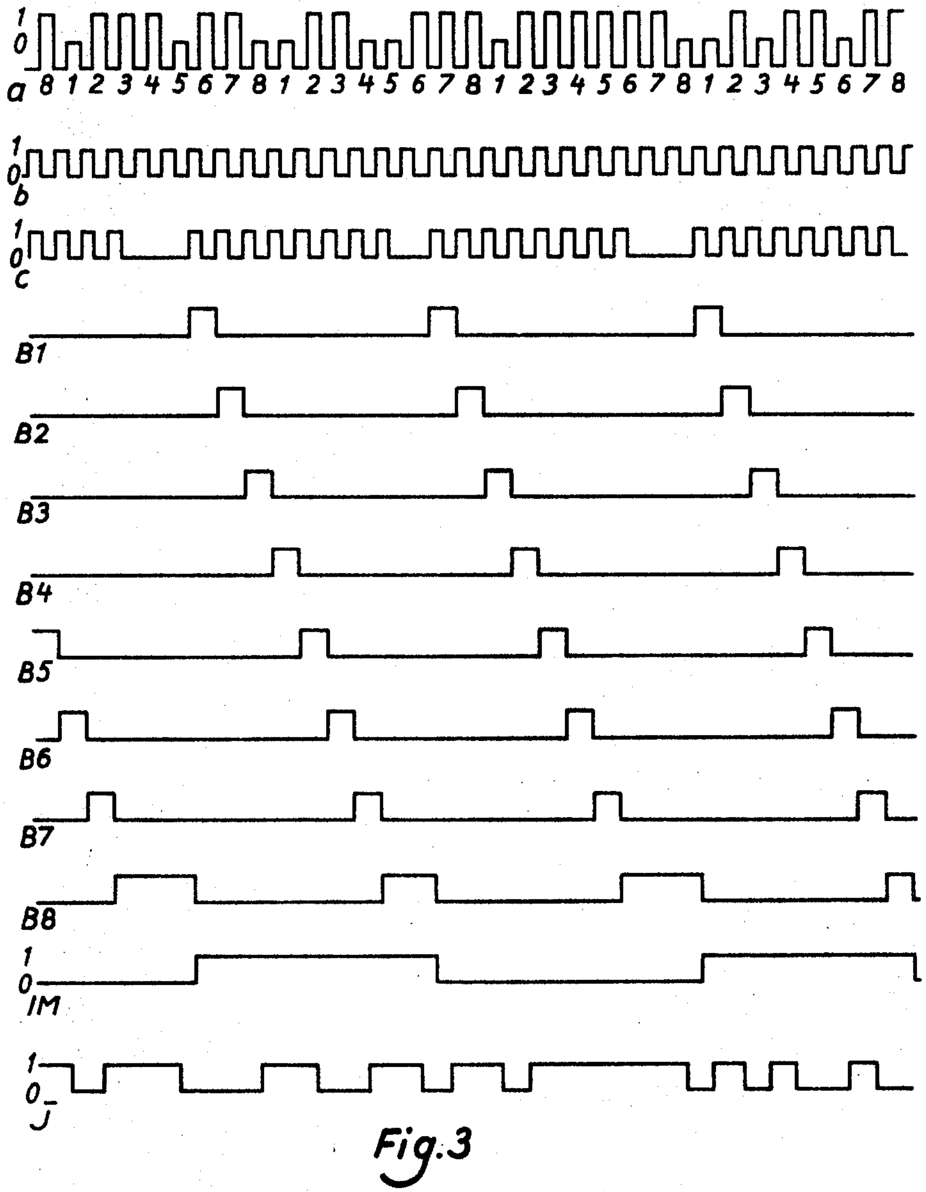

The invention will be described in more detail in connection with an example with reference to the accompanying drawing, in which FIG. 1 shows the synchronization information, FIG. 2 shows a block diagram of the part of the receiver that is used for synchronization, and FIG. 3 shows diagrams of waveforms at various points of the arrangement according to FIG. 2.

In the upper row in FIG. 1 the number of the 16 channels are indicated, within which the information to the receiver according to the example is transmitted cyclically in a time division multiplex form. In the lower row the last bit position within each channel is stated, which position is used for transmission of synchronization information. In the following it will be assumed that this bit position is the eighth within the respective channel, i.e. it is preceded by seven bits which in a binary form represent the information transmitted within the channel. As can be seen in FIG. 1 the synchronization information consists of a regular pattern composed of e.g. alternately occuring zeros and ones, and two irregularities occurring within the channels 8 and 16. How this pattern is used will be described in connection with the diagrams, shown in FIG. 3, of the states in the arrangement according to FIG. 2.

In FIG. 2 reference I denotes the input of a PCM-receiver, to which information is transmitted within 16 channels in a time division multiplex form, each channel comprising seven information bits and a synchronization bit. Only the part of the receiver which causes the incoming signals to obtain the right position and channel is shown. The input is connected to a clock pulse generator K generating a pulse at each incoming bit. The clock pulse generator is connected to a counter BR consisting of three binary flip-flops V1, V2 and V3 via an AND gate G1. The outputs of the flip-flops, on which 8 different digit combinations may occur, are connected to a bit distributor BF, provided with 8 outputs B1—B8, whereby a signal occurs at an output defined by the states of the flip-flops, and this output determines to which bit position the bit obtained at the input of the receiver is to be supplied. The output B1 is furthermore connected to the input of a counter KR consisting of four series-connected flip-flops V4, V5, V6 and U7 via an AND gate G2, the function of which will be explained below. The outputs of these flip-flops are connected to a channel distributor KF provided with 16 outputs, a certain output of the channel distributor being activated in dependence of the states of the flip-flops, and the incoming signals are supplied to the corresponding channel. The output B1 is furthermore connected to one input of an AND gate G3, and to the other inverting input of which the outputs 8 and 16 are connected via an OR gate G4. From the gate G3 an output signal is thus obtained each time that the output 1 of the bit distributor is activated if the outputs 8 or 16 of the channel distributor are not activated This output signal controls a bistable flip-flop V8, on the output of which a signal is obtained whose value changes when the bit distribution in a channel starts unless the channel has the number 8 or 16. The output TM of this flip-flop is connected to one input of a comparison circuit D, to the other input of which the incoming PCM-signals are supplied from the input I. The comparison circuit is then arranged so that if the two input signals are not equal a signal is obtained at its output $\bar{J}$. The output $\bar{J}$ is connected to one input of an AnD gate G5, to the other input of which the output B8 of the bit distributor is connected. One output $\bar{S}$ of a bistable flip-flop V9, provided with two outputs S and $\bar{S}$, is connected to a third input of the AND gate G5. The state of this flip-flop indicates whether synchronism is at hand between the transmitter and the receiver, in which case the output S is activated, while in the opposite case the output S is activated, as will be explained later. The output of the gate G5 is connected to one input of an AND gate G6, the output of which is connected to both a zero-setting input 0 of a counter C, and to an inverting input of the AND gate G1. The counter is provided with an output R which is activated if the number in the counter is below 3. The other input of the gate G6 is then connnected to the output R of the counter C. The counter BR will thus not be stepped forward by the clock pulse generator K if the input signals of the comparison circuit D are not equal at the same time as the output B8 of the bit distributor is activated and the flip-flop V9 indicates that synchronism is not at hand and the counter C has a value less than 3. The output $\bar{J}$ of the comparison circuit is moreover connnected to an inverting input of an AND gate 67, to the three further inputs of which the output R1 of the counter, the output $\bar{S}$ of the flip-flop V9 and the output B8 are connected. The output of the gate G7 is connected to a forward-stepping input +1 of the counter C, whereby this counter counts the output pulses of the gate. The output R of the counter is also connected to an inverting input of an AND gate G8, the other input of which is connnected to the output of the gate G5 and the output of which is connected to the control input of the flip-flop V9, and to an input of two AND gates G9 and G10. THe other input of the gate G9 is connected to the output IM of the flip-flop V8 and its output is connected to an input $I^0$of the counter KR, the activation of said input having as a result that the output K9 of the channel distributor is activated. In a corresponding way the other inverting input of the gate G10 is connected to the output IM and the output of the gate is connected to an input $I^1$of the counter KR, the activation of the input having as a result that the output KI of the channel distributor is activated. The output S of the flip-flop V9 is connected to the other input of the gate G2, whereby the channel distributor will not be activated when synchronism is not at hand. The function of the described arrangement will now be explained in more detail with reference to FIG. 3.

In FIG. 3 diagrams are shown of the waveforms at various points of the arrangements according to FIG. 2, whereby it has been assumed that when the shown process is initiated synchronism is not at hand between the transmitter and the receiver. This is indicated by the flip-flop V9 being in such a state that is s output S is activated. Furthermore it is presumed that neither the output K8 nor the output K16 in the channel distributor is activated. On line a of FIG. 3 the binary digits supplied from the transmitter to the input I of the receiver are shown. Below each digit it is stated to which bit position the digit belongs, i.e. the number of the output in the bit distributor that is to be activated when the digit is received for providing synchronism. It is furthermore presumed that the signals in the bit position 8 according to FIG. 1 form a regular pattern consisting of alternately zeros and ones. On line bthe clock pulsed from the clock pulse generator K controlled by the digits are shown. It is then presumed that the trailing edge of the binary digits gives rise to a clock pulse. Line cshows the clock pulses which pass the gate G1 and, via the counter BR, steps the bit distributor BF forward. The lines B1 and B8 show the activation of the corresponding outputs of the bit distributor BF, and the line IM shows the signals generated by the flip-flops Y8. Line $\bar{J}$ Finally shows the output signal from the output $\bar{J}$ of the comparison circuit D.

When the received pulse first shown on line a and belonging to the bit position 8 is received, the output B5 of the bit distributor B5 is according to the figure activated, i.e. the bit distributor is in an asynchronous state. The clock pulse (line b) caused by the pulse steps the counter forward, so that it has activated the output B6 in the bit distributor a the next received pulse and this forward-stepping is repeated during the two following pulses, so that the output B8 of the bit distributor is activated when the pulse belonging to the bit position 3 occurs at the receiver input. After this pulse, however, no forward-stepping pulse will be supplied to the counter BR, as according to the conditions of the figure a signal is obtained at the output of the gate G6, which has as a result that the clock pulses cannot pass the gate G1. The output signal of the gate G6 furthermore sets the counter C to zero. This output signal will not cease until the signal at the output $\bar{J}$ ceases, i.e. when conformity is obtained between the signal from the flip-flop V8 which is zero and the signal at the pulse belonging to the bit position 5 supplied to the input I, the last mentioned signal also having the value zero. Thus the counter C is stepped forward via the gate G7 and the forward-stepping of the counter BR and the successive activation of the inputs B1 to B7 is again initiated at the same time as the flip-flop V8 changes it state when the output B1 is activated. The first bit to be received after the output B8 has again been activated is a zero (belonging to the bit position 5) whereby the gate G1 blocks the clock pulses to the counter BR, because the state of the flip-flop V8 the output $\bar{J}$ of the comparison circuit is activated. At the same time the counter C is set to zero. The next pulse to be received has however the value one, whereby the successive forward-stepping of the counter BR is again initiated, at the same time as the counter C is stepped forward by one step and the flip-flop V8 changes its output value. When the output 8 in the bit distributor has been activated the next time, the two first pulses (position 6 and 7 ) to be received are ones. The flip-flop V8 being in its zero state the clock pulses following after the pulses do not pass the gate G1. The third pulse to be received has however the value zero and, as this pulse belongs to the bit position 8, the bit distributor of the receiver has been set to a value that is synchronous with the transmitter. If it is presumed that the process shown in FIG. 3 take place within the channels in which the last bit is a regular pattern of alternately arranged zeros and ones, the following activation of the output B8 in the bit distributor will not, on account of the changes of the flip-flop U8, result in an output signal form the gate G5. This depends on the fact that when the bit distributor is in this state, no signal will be obtained at the output $\bar{J}$ of the comparison circuit D. This causes the zero-setting pulses to the counter C to cease. If the counter is not stepped forward three times without the occurrence of a zero-setting pulse it can be regarded that there is synchronism between the bit distributors of the transmitter and the receiver. The output signal of the counter ceases, causing the gates G6 and G7 to be blocked. When the transmitter, after a certain time, transmits the last bit of channel 8 or 16, an output signal will be obtained form the gate G5 because of the irregularity in the synchronization pattern. This signal is supplied via the gate G8 to the control input S of the flip-flop V9, while the activation of the output $\bar{S}$ ceases. The output signal of the gate G8 moreover sets the counter KR via the inputs $I^1$or $I^9$in such a manner that the output KI or K9 of the channel distributor is activated, whereby the transmitter and the receiver are set synchronously. After that signals will no longer occur the same time on the output B8 of the bit distributor and on the output $\bar{J}$ of the comparison circuit, as the flip-flop V8 does not change its value between the channel 7 and 8 and 15 and 16 respectively. This depends on the fact that the channel outputs $K^8$and $K^{16}$are connected to the inverting input of the gate G3 via the gate G4.

For indicating whether asynchronism has occurred again, it is thus in principle sufficient to connect the output B8 in the bit distributor and the output $\bar{J}$ of the comparison circuit to the inputs of an AND gate, not shown in FIG. 2 and to make this output signal set the flip-flop V9 to zero, which causes the synchronization process described above to be initiated again. This output signals may then also be used for setting the channel distributor in a suitable state, i.e. a state in which neither the output K8 nor the output K16 is activated.

The synchronization code described above is, as has been mentioned, only an example of how the method according to the invention may be utilized. The important characteristic of the synchronization code is of course that it consists of a regular part, used for setting of the bit distributor, and irregularities occurring within certain channels for setting of the channel distributor. The regular part may of course also consist of only zeros and the irregularity may consist in an occuring one.

We claim:

1. In a time division multiplex system having a transmitting terminal and a receiving terminal, wherein said receiving terminal includes a bit and a channel distributor and said transmitting terminal transmits a pulse train which includes binary coded pulses grouped in cyclically occurring channels and binary synchronizing pulses assigned to definite bit positions within said cyclically occurring channels, said synchronizing pulses forming a regular recurrent pattern in which irregularities are provided by means of a second superimposed regular recurrent pattern, said first pattern being employed for restoring synchronism of said bit distributor and said superimposed pattern being employed for restoring synchronism of said channel distributor of said receiving terminal, a synchronism restoring arrangement comprising means operative in response to said bit distributor for normally generating pulses which are synchronous with respect to said synchronizing pulses, means operative in response to said channel distributor for normally in predetermined channels, inhibiting said synchronous pulses to create a local pulse train which is synchronous with respect to said synchronizing pulses and having the same recurrent pattern, means for comparing the timing of said local pulse train with respect to said synchronizing pulses, means operative in response to a loss of synchronism between said local pulse train and said synchronizing pulses for intermittently interrupting said bit distributor until synchronism is restored, means for interrupting said channel distributor until a synchronizing pulse which is part of said superimposed pattern is received after synchronism of said bit distributor has occurred over a predetermined number of successive channels, and means for setting said channel distributor to receive a definite channel when said interruption ceases, said definite channel being the channel following the channel of said synchronizing pulse which is part of said superimposed pattern.